United States Patent [19]

McAuslin

[11] Patent Number: 5,044,087
[45] Date of Patent: Sep. 3, 1991

[54] LINE LEVEL APPARATUS

[76] Inventor: Brian McAuslin, 1050 Broad Rock Rd., South Kingstown, R.I. 02879

[21] Appl. No.: 594,422

[22] Filed: Oct. 5, 1990

[51] Int. Cl.⁵ .............................................. G01C 9/28
[52] U.S. Cl. .................................................... 33/369
[58] Field of Search ........................ 33/369, 1 LE, 413

[56] References Cited

U.S. PATENT DOCUMENTS

| | | | |
|---|---|---|---|
| 1,369,652 | 2/1921 | Hall | 33/369 |
| 2,014,709 | 9/1935 | Volz | 33/369 |

Primary Examiner—Harry N. Haroian
Attorney, Agent, or Firm—Leon Gilden

[57] ABSTRACT

An apparatus is arranged relative to a port or line to suspend the apparatus and effect leveling of the associated line. The apparatus includes a housing, with a top wall defined by an elongate opening, with a liquid level member positioned within the housing. The top wall further includes a first and second slot to each side of the housing, with each slot mounting hook members that are normally biased together to define an enclosed loop and are biased apart to a second position for opening relative to the line to effect mounting of the housing to the line.

5 Claims, 2 Drawing Sheets

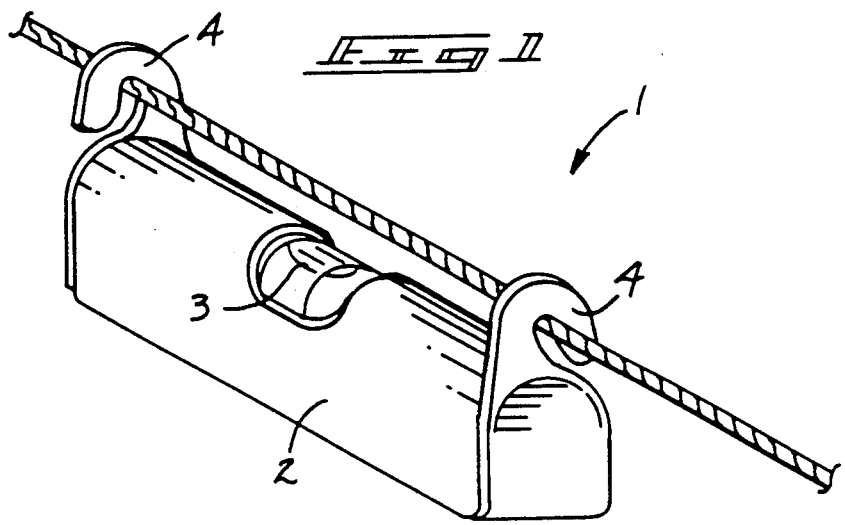
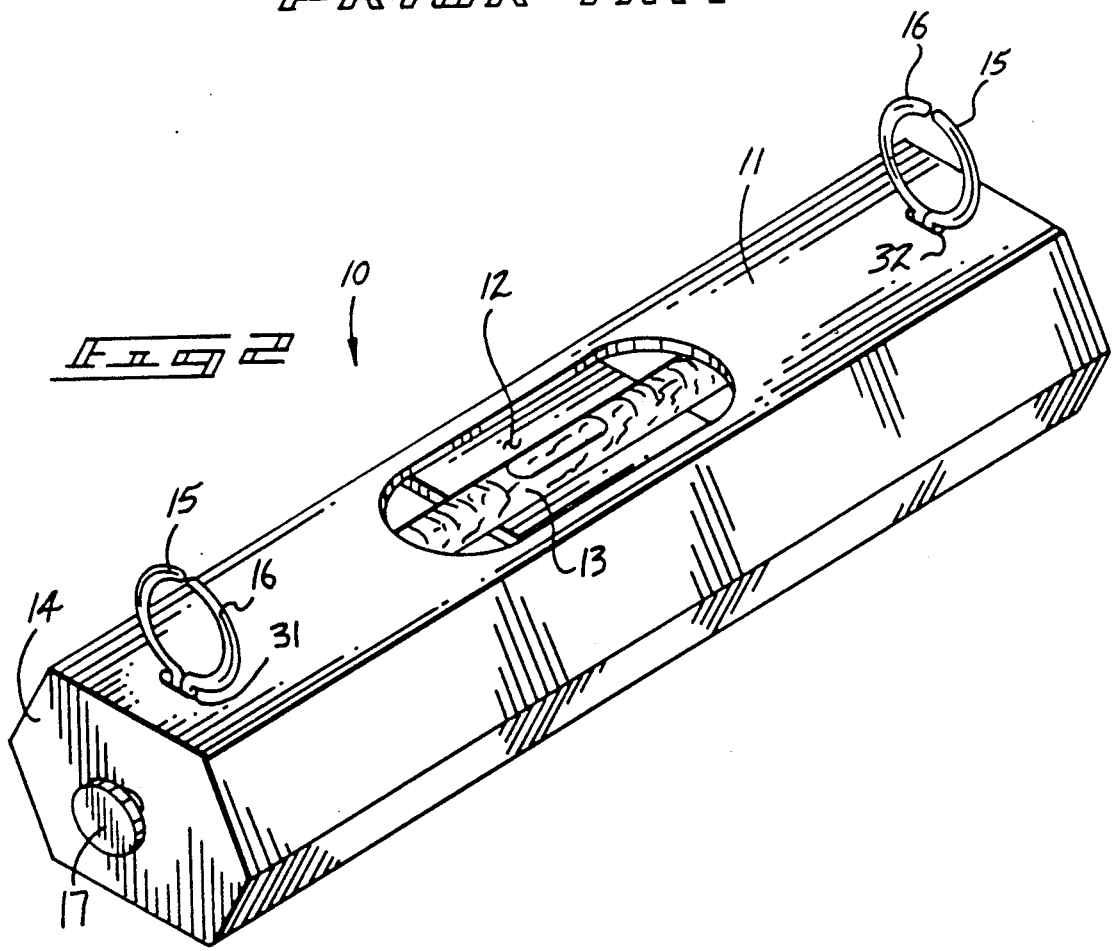

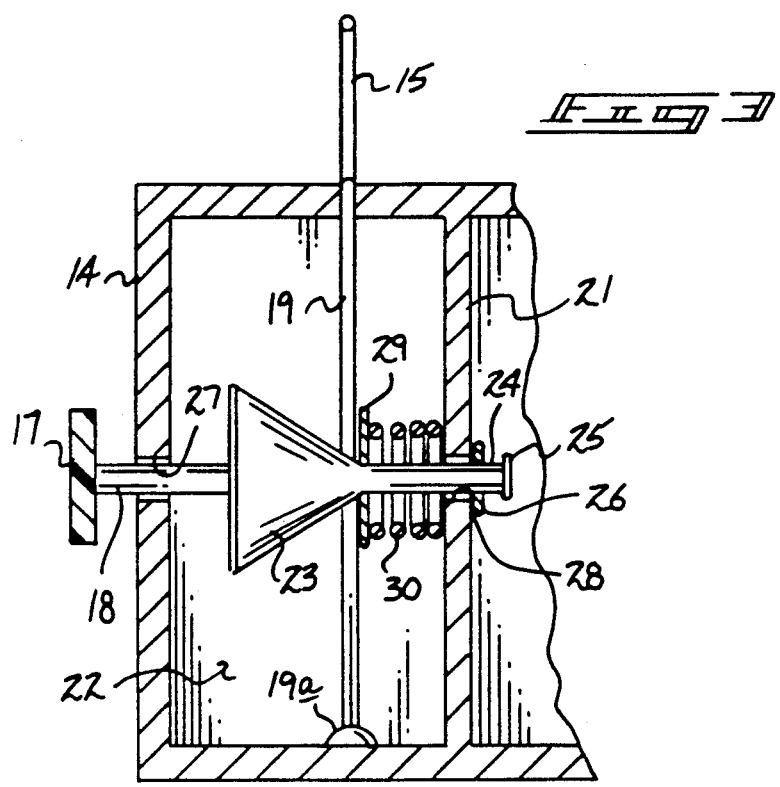
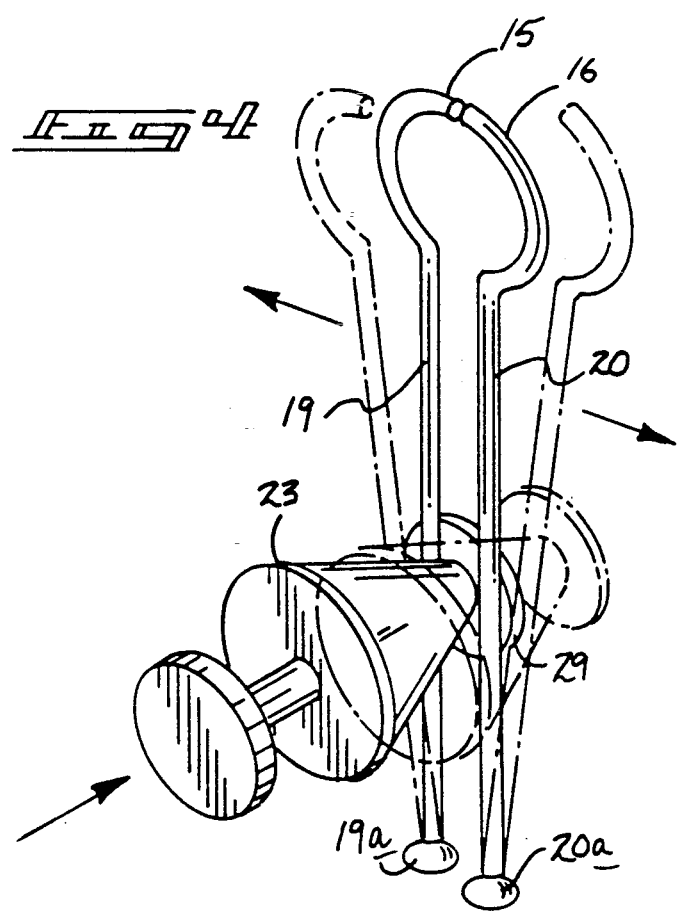

LINE LEVEL APPARATUS

BACKGROUND OF THE INVENTION

1. Field of the Invention

The field of invention relates to line level structure, and more particularly pertains to a new and improved line level apparatus wherein the same permits ease of mounting and security of mounting to an associated line for effecting leveling of the line relative to a horizontal datum.

2. Description of the Prior Art

Various line level apparatus has been set forth in the prior art, wherein such organizations are suspended relative to lines in an effort to effect measurement and positioning of the lines in a horizontal orientation. Such apparatus is exemplified in U.S. Pat. No. 2,770,888 to Bon Duyke wherein a line level includes hook members mounted to each end of a housing for mounting of the housing to a line member.

U.S. Pat. No. 4,068,386 to Streeter sets forth a line level, wherein pairs of opposing hooks are mounted to each end of the housing for mounting of the housing to a line member.

U.S. Pat. No. 3,878,617 and U.S. Pat. No. 1,716,744 are further examples of line level housing utilizing hook members to mount the housing to an associated line.

As such, it may be appreciated that there continues to be a need for a new and improved line level apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of line level apparatus now present in the prior art, the present invention provides a line level apparatus wherein the same utilizes hooks that are spread to a spaced relationship to accommodate a line therebetween and are released to a first position to secure the line within each hook pair of the housing. As such, the general purpose of the present invention, which will be described subsequently in greater detail, is to provide a new and improved line level apparatus which has all the advantages of the prior art line level apparatus and none of the disadvantages.

To attain this, the present invention provides an apparatus arranged relative to a port or line to suspend the apparatus and effect leveling of the associated line. The apparatus includes a housing, with a top wall defined by an elongate opening, with a liquid level member positioned within the housing. The top wall further includes a first and second slot to each side of the housing, with each slot mounting hook members that are normally biased together to define an enclosed loop and are biased apart to a second position for opening relative to the line to effect mounting of the housing to the line.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved line level apparatus which has all the advantages of the prior art line level apparatus and none of the disadvantages.

It is another object of the present invention to provide a new and improved line level apparatus which may be easily and efficiently manufactured and marketed.

It is a further object of the present invention to provide a new and improved line level apparatus which is of a durable and reliable construction.

An even further object of the present invention is to provide a new and improved line level apparatus which is susceptible of a low cost of manufacture with regard to both materials and labor, and which accordingly is then susceptible of low prices of sale to the consuming public, thereby making such line level apparatus economically available to the buying public.

Still yet another object of the present invention is to provide a new and improved line level apparatus which provides in the apparatuses and methods of the prior art some of the advantages thereof, while simultaneously overcoming some of the disadvantages normally associated therewith.

Still another object of the present invention is to provide a new and improved line level apparatus wherein the same is readily conveniently mounted to an associated line within an enclosed loop adjustably mounted to each end of a housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art line level apparatus.

FIG. 2 is an isometric illustration of the instant invention.

FIG. 3 is an orthographic cross-sectional illustration of the actuator mechanism of the instant invention.

FIG. 4 is an isometric illustration of the actuator mechanism of the instant invention.

DESCRIPTION OF THE PREFERRED EMBODIMENT

With reference now to the drawings, and in particular to FIGS. 1 to 4 thereof, a new and improved line level apparatus embodying the principles and concepts of the present invention and generally designated by the reference numeral 10 will be described.

FIG. 1 illustrates a prior art line level apparatus 1, wherein a housing 2 includes a spirit level 3 medially thereof and a plurality of hooks 4 in opposed orientation at each end of the housing for securement of the housing to a suspension line, as illustrated.

More specifically, the line level apparatus 10 of the instant invention essentially comprises an elongate housing of uniform cross-sectional configuration, including a top wall 11 and spaced parallel end walls 14. The top wall 11 includes an elongate opening 12 formed medially of the top wall providing visual access to a liquid level member 13 aligned parallel to a longitudinal axis of the housing. The top wall further includes spaced parallel slots defined by a first slot 31 and a second slot 32, with each slot including a pair of shafts directed therethrough defined by a first shaft 19 and a second shaft 20, wherein each shaft includes a respective foot defined by a first shaft foot 19a and a second shaft foot 20a. The shafts are resiliently biased towards one another, in a manner as illustrated in FIG. 4, in a first position, wherein the first and second shafts include respective first and second "C" shaped hooks 15 and 16 formed at an upper end thereof, wherein the hooks define an enclosed loop, in a manner as illustrated in FIG. 2 for example, in the first position and are spaced apart in a second position to define a gap therebetween to permit fastening of the line level apparatus 10 to a suspension line, of a type as illustrated in FIG. 1. A knob 17 is fixedly mounted to a rear terminal end of a rear actuator shaft 18 that is directed through an end wall aperture 27 of each end wall 14. An interior wall 21 is formed within the housing spaced from and parallel within the housing defining a chamber therebetween. The interior wall 21 includes an interior wall aperture 28, wherein the end wall aperture 27 and the interior wall aperture 28 are coaxially aligned relative to one another. The rear actuator shaft 18 has fixedly mounted thereon a conical actuator 23 whose forward terminal end is positioned between the first and second shafts 19 and 20 in the first position, with an abutment plate 29 orthogonally mounted to the axis of the conical actuator 23 to position the conical actuator relative to the spaced first and second shafts in the first position. A spring 30 is captured between the abutment plate 29 and the interior wall 21 and mounted about a forward actuator shaft 24 that is coaxially aligned with the rear actuator shaft 18. The forward actuator shaft 24 projects through the interior wall aperture 28 and terminates in a forward actuator shaft projection 25, with a locking clip 26 securing the projection 25 exteriorly of the chamber 22. As may be understood, upon depressing of each knob 17, each pair of first and second "C" shaped hooks 15 and 16 are spread apart to accept the line member therewithin. Each pair of "C" shaped hooks 15 and 16 mounted adjacent each end of the housing are of identical construction, in a manner as set forth in FIG. 3, where it is understood that discussion of the actuation of the first and second "C" shaped hooks 15 and 16 is applicable to each pair of "C" shaped hooks adjacent each end of the housing.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A line level apparatus comprising, in combination,
   an elongate housing, the elongate housing including spaced parallel end walls, and
   a top wall, with the top wall including a liquid level member mounted medially thereof, each end wall including an actuator member, each actuator member mounted through each end wall, and
   the top wall including a plurality of slots, each slot positioned adjacent each end wall through the top wall, with each slot including a first and second "C" shaped hook projecting exteriorly thereof from within the housing cooperative with the actuator member to effect selective spreading of the first and second "C" shaped hooks from a first position defining an enclosed loop to a second position, wherein the first and second "C" shaped hooks define a gap therebetween to permit securement to a line member.

2. An apparatus as set forth in claim 1 wherein the housing includes an interior wall spaced from and parallel the end wall interiorly of the housing to define a chamber between each end wall and each interior wall, and the actuator member including a rear shaft directed through the rear wall, and a forward shaft directed through the interior wall, and a conical actuator coaxially mounted between the rear shaft and the forward shaft, and the first "C" shaped hook including a first shaft and the second "C" shaped hook including a second shaft, with the conical actuator positioned medially of the first and second shafts rearwardly thereof in a first position, and the conical actuator positioned between the first and second shaft in the second position.

3. An apparatus as set forth in claim 2 wherein an abutment plate is mounted to a forward terminal end of the conical actuator, and a spring member is mounted between the abutment plate and the interior wall to bias the conical actuator to the first position.

4. An apparatus as set forth in claim 3 wherein each end wall includes an end wall aperture, and the interior wall includes an interior wall aperture, wherein the end wall aperture and the interior wall aperture are coaxially aligned relative to one another, and the rear shaft is directed through the end wall aperture and the forward shaft is directed through the interior wall aperture, and the forward shaft includes a projection fixedly mounted to a forward terminal end of the shaft, wherein the projection is positioned exteriorly of the chamber, and a locking clip is mounted between the projection and the interior wall to maintain the projection exteriorly of the interior wall.

5. An apparatus as set forth in claim 4 wherein the first and second shafts are biased towards one another in the first position, wherein the first and second shafts are parallel relative to one another in the first position.

* * * * *